Dec. 17, 1935.
H. I. WRIGLEY
2,024,901
ANGLE COCK DEVICE
Filed March 15, 1933
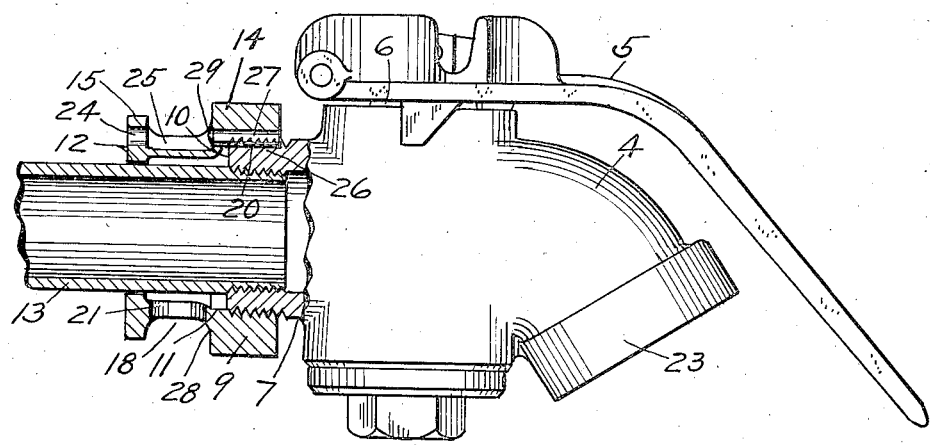
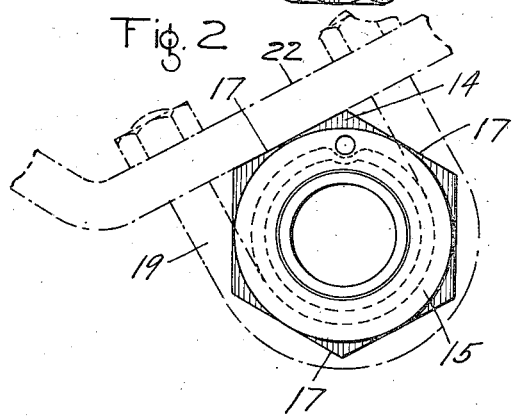
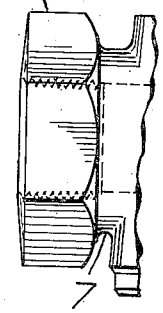
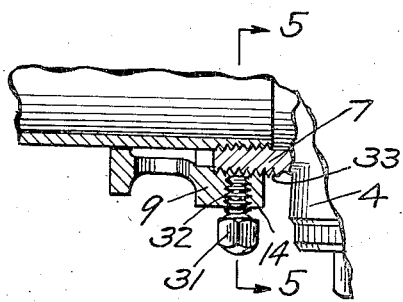
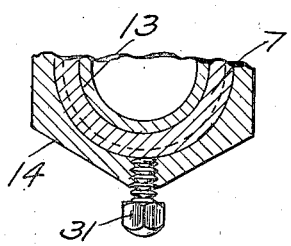
*INVENTOR*
HENRY I. WRIGLEY
BY
Wm. M. Cady
*ATTORNEY*

Patented Dec. 17, 1935

2,024,901

UNITED STATES PATENT OFFICE 2,024,901

ANGLE COCK DEVICE

Henry I. Wrigley, Oak Park, Ill., assignor to The Westinghouse Air Brake Company, Wilmerding, Pa., a corporation of Pennsylvania Application March 15, 1933, Serial No. 660,779

3 Claims. (Cl. 285—13)

This invention relates to angle cocks used in fluid pressure brake systems and particularly to the fittings appurtenant thereto for attaching them to a car and for connecting them to the brake pipe and to the method of securing the fittings to the angle cock body.

Angle cocks commonly in use are provided with a threaded bore for receiving the threaded end of a brake pipe in the manner of the usual pipe fitting, and consequently the threads of pipe and angle cock body are subjected to lateral or transverse stresses which tend to loosen the joint and cause leakage. Where this type of fitting is employed, the brake pipe is usually fastened to the car adjacent to the angle cock which is supported by the pipe, and stresses imposed by the flexible hose connection and the operation of the angle cock valve further tend to loosen the angle cock.

Because of these objectionable features, improved angle cocks have been applied in service which are provided with an integral sleeve-like extension having a threaded bore for receiving the threaded end of a brake pipe, and with an unthreaded cylindrical portion, which engages the unthreaded exterior surface of the brake pipe at a point remote from the threaded portion of the pipe, and which supports the pipe and relieves the threaded joints from transverse or lateral stresses.

The integral projecting connection on the improved type angle cock is provided with a hexagonal wrench receiving flange portion and an external annular groove which constitutes a seat for a U-bolt, which serves to fasten the angle cock to a car with a flat of the hexagonal flange in engagement with a flat plate provided on the car. Thus the improved type angle cock is rigidly secured to the car and cannot turn relative to the brake pipe or transmit lateral stresses thereto tending to loosen it.

There are at the present time a great number of angle cocks of the old type mounted on old obsolete cars and which are still serviceable and which could be advantageously used on new and repaired brake equipment were it not for the fact that they are not adapted for use with the standard brake pipe mounting employed on new cars and repaired car equipment. By proper alteration of the old type angle cocks, they may be equipped so that they may be fitted to the new and repaired car equipment.

It is an object of this invention to provide a bushing which may be applied to the old type angle cock and which when so applied will provide an angle cock having all the advantages of the new type of angle cock and at a cost considerably less than the cost of a new and improved angle cock. For this purpose, the usual hexagonal wrench receiving flange of the old angle cock is turned off to provide a cylindrical surface which is then externally threaded. An internally threaded bushing having two spaced annular flanges on the external surface thereof is threaded upon the externally threaded portion of the old type angle cock body, one of the flanges being hexagonal so as to receive a wrench for screwing the bushing in place, one of the flat faces of the hexagonal flange being adapted to engage a flat hanger plate which is secured to the car. Between the flanges, an annular groove is formed for receiving the usual U-bolt now commonly employed for securing the improved type angle cock body to the car.

A further object of the invention is to provide a bushing for converting an old type angle cock so that it may be secured to the improved type mounting for an improved type angle cock, wherein an unthreaded supporting seat portion is provided at the end of the bushing for engaging the pipe at a point remote from the threaded portion of the pipe, so that lateral stresses cannot be imposed upon the threaded portion of the pipe.

It is an object of this invention to provide a bushing for converting old type angle cocks wherein the joint between the bushing and the angle cock is isolated from the interior of the brake pipe and not exposed to fluid under pressure. It is, therefore, not necessary to provide a fluid tight connection.

These and other objects that will be made apparent throughout the further description of the invention are attained by means of the angle cock device hereinafter described and illustrated in the accompanying drawing; wherein Fig. 1 is an elevational view, partly in section, of an angle cock device embodying features of the invention;

Fig. 2 is an end view of the improved bushing shown in Fig. 1;

Fig. 3 is an elevational view of a fragment of an old type angle cock body;

Fig. 4 is a fragmental sectional view of a portion of an angle cock body showing a modified form of bushing retaining device; and Fig. 5 is a transverse section on the line 5—5 of Fig. 4.

Referring to Fig. 1, a modified or converted angle cock device of the old type is shown which comprises a metal body 4 having a bore in which a valve of the plug type is mounted and which is actuated by an operating handle 5 that is attached to the stem 6 of the valve. The plug valve forms no part of this invention and, therefore, will not be specifically described.

In Fig. 3 the usual projecting pipe connection portion 7 of the old type angle cock is shown, which is provided with the usual wrench receiving hexagonal flange 8 by means of which the angle cock is screwed upon the brake pipe. In order to convert the old type angle cock, the hexagonal flange of the connection portion 7 is turned off in a lathe and externally threaded, preferably with a straight thread, as indicated in Fig. 1. A bushing 9 such as shown in Figs. 1 and 2, and having an internally threaded bore 11, is threaded upon the threaded portion of the projecting connection 7 and is provided internally with an annular supporting seat 12, that is adapted to engage the unthreaded portion of the brake pipe 13 at a point remote from the point of attachment of the threaded portion of the brake pipe to the internally threaded projecting connection 7 on the angle cock body. Externally, the bushing 9 is provided with a hexagonal flange 14 and a circular flange 15 having a diameter equal to the diametral distance between opposing flats 17 of the hexagonal flange 14, so that both flanges engage the hanger plate and provide a two point seating contact therewith. The flanges 14 and 15 are spaced apart so as to provide an annular groove 18 between them for receiving the usual U-bolt 19 commonly employed to secure an improved type angle cock to the car.

The bushing 9 is provided with a drainage hole 21 for permitting the escape of any liquid that may leak from the threaded pipe joint.

As indicated in Fig. 2, a flat 17 of the flange 14 engages a flat plate 22 that is secured in horizontal position upon a car. It is desirable that the angle cock connection 23, to which the flexible connection hose is attached, be disposed at a slight angle with respect to the vertical when the angle cock is secured upon the flat hanger plate 22 on the car, and this position of the angle cock is determined by the angular position of the flat 17 with relation to the angle cock body.

In order to fix the bushing 9 in a predetermined angular relation with respect to the angle cock body, the following procedure is employed. The bushing when manufactured is provided with a guide hole 24 drilled through the flange 15 and through a portion 25 of the body of the bushing between the flanges 14 and 15. After the bushing has been properly placed upon the angle cock body, a drill is inserted through the guide hole 24, and the engaging threaded portions of the flange 14 of the bushing and the angle cock body are then drilled to provide half-round key slots 10 and 20, which when aligned constitute a hole or keyway 26 for receiving a round pin or key 27 which serves to prevent relative rotation of the bushing and the angle cock body.

The flange 9 is filleted at 28 and after the drill has bored the hole 26, a projecting portion 29 of the fillet, not cut away by the drill, remains, which portion may be peened over as indicated in Fig. 1, to provide an integral stop lug for preventing withdrawal of the pin 27 from the key hole 26.

By reason of the provision of the bushing constructed as shown in Figs. 1 and 2, an old type angle cock may be converted into an angle cock having the structural features and advantages of the improved type angle cock referred to above and the angle cock may be secured to the car by means of the standard attaching devices now employed for securing improved type angle cocks to new and repaired cars.

In Figs. 4 and 5, a modified form of retaining means is shown, wherein the bushing 9 is locked against angular movement with respect to the body 4 of the angle cock by means of a set screw 31 that is threaded in a threaded hole 32 in the hexagonal flange 14, so that the inner end thereof engages the thread 33 on the projecting connection 7. The set screw serves to retain the bushing 9 in any adjusted position with respect to the angle cock body.

While but two embodiments of the invention are disclosed herein, it is obvious that changes may be made in the construction without departing from the spirit of the invention.

Having now described my invention, what I claim as new and desire to secure by Letters Patent, is:

1. The combination with an angle cock body having an externally threaded projecting portion provided with an internally threaded bore for receiving the threaded end of a pipe, of a bushing for supporting the pipe threaded upon the external thread of said portion and having a supporting seat for engaging said pipe at a point remote from the threaded portion of said pipe, and a flat external portion for engaging a support and cooperating therewith for preventing rotation of the bushing with respect to said support, and means for positioning said bushing in a predetermined angular position with respect to the angle cock and for preventing relative angular movement between said bushing and said angle cock.

2. The combination with an angle cock body having an externally threaded projecting portion provided with an internally threaded bore for receiving the threaded end of a pipe, of an internally threaded attaching bushing threaded on the external thread of said portion and having an annular external groove constituting a seat for an attaching U-bolt, and a flat external portion for engaging a support and cooperating therewith for preventing rotation of the bushing with respect to said support, and means for preventing relative angular movement between the bushing and angle cock body, comprising a pin extending into an opening formed by cooperating grooves in the wall of said bushing and said angle cock body.

3. The combination with an angle cock body having a projecting portion threaded exteriorly and having a threaded bore for receiving the threaded end of a pipe, of an internally threaded bushing threaded upon the external thread of said portion, said bushing having integral spaced flanges forming an external groove for receiving an attaching U-bolt, said bushing having a water drain hole in one side thereof for permitting the escape of any liquid that may leak from the threaded pipe joint, and means for preventing relative rotation between the bushing and the angle cock body, said means comprising a set screw extending through a threaded hole in the bushing and having its inner end in engagement with said projecting portion of the angle cock body.

HENRY I. WRIGLEY.